United States Patent
Hotta et al.

(10) Patent No.: US 10,461,370 B2
(45) Date of Patent: Oct. 29, 2019

(54) SECONDARY BATTERY, BATTERY PACK, AND VEHICLE

(71) Applicant: Kabushiki Kaisha Toshiba, Minato-ku (JP)

(72) Inventors: Yasuyuki Hotta, Tokyo (JP); Shinsuke Matsuno, Tokyo (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/444,945

(22) Filed: Feb. 28, 2017

(65) Prior Publication Data

US 2018/0083321 A1 Mar. 22, 2018

(30) Foreign Application Priority Data

Sep. 16, 2016 (JP) .................................. 2016-182032

(51) Int. Cl.
*H01M 14/00* (2006.01)
*H01M 10/36* (2010.01)
(Continued)

(52) U.S. Cl.
CPC ......... *H01M 10/36* (2013.01); *H01M 2/1077* (2013.01); *H01M 4/485* (2013.01);
(Continued)

(58) Field of Classification Search
CPC ............ H01M 10/36; H01M 10/4235; H01M 2/1077; H01M 4/485; H01M 4/505;
(Continued)

(56) References Cited

U.S. PATENT DOCUMENTS 6,280,883 B1   8/2001   Lamanna et al.
6,403,253 B1   6/2002   Wainwright et al.
(Continued)

FOREIGN PATENT DOCUMENTS

JP   9-508490    8/1997
JP   2000-77073  3/2000
(Continued)

OTHER PUBLICATIONS

S. Liu et al. "Rechargeable Aqueous Lithium-Ion Battery of $TiO_2$/Li $Mn_2O_4$ with a High Voltage", Journal of the Electrochemical Society, 158, 2011, 8 pages.
(Continued)

*Primary Examiner* — Jane J Rhee
(74) *Attorney, Agent, or Firm* — Oblon, McClelland, Maier & Neustadt, L.L.P.

(57) ABSTRACT

According to one embodiment, a secondary battery is provided. The secondary battery includes a positive electrode, a negative electrode, and an electrolyte. The electrolyte contains a water-containing solvent and a nitrogen atom-containing organic sulfur compound. The concentration of the nitrogen atom-containing organic sulfur compound in the electrolyte is within a range of from 0.001 mM to 20 mM.

16 Claims, 8 Drawing Sheets

(51) Int. Cl.
  *H01M 2/10* (2006.01)
  *H01M 4/485* (2010.01)
  *H01M 4/505* (2010.01)
  *H01M 4/525* (2010.01)
  *H01M 4/58* (2010.01)
  *H01M 10/42* (2006.01)

(52) U.S. Cl.
  CPC ........... *H01M 4/505* (2013.01); *H01M 4/525* (2013.01); *H01M 4/5825* (2013.01); *H01M 10/4235* (2013.01); *H01M 2220/20* (2013.01); *H01M 2300/0002* (2013.01)

(58) Field of Classification Search
  CPC ............... H01M 4/525; H01M 4/5825; H01M 2220/20; H01M 2300/0002
  See application file for complete search history.

(56) References Cited

U.S. PATENT DOCUMENTS

| | | | |
|---|---|---|---|
| 2008/0107963 A1* | 5/2008 | Lee | H01M 2/0275 429/174 |
| 2010/0167129 A1 | 7/2010 | Wu et al. | |
| 2013/0130128 A1 | 5/2013 | Okamoto et al. | |
| 2014/0120380 A1* | 5/2014 | Inagaki | C01G 33/00 429/7 |
| 2015/0188193 A1 | 7/2015 | Kodama et al. | |
| 2015/0318530 A1 | 11/2015 | Yushin et al. | |
| 2016/0043442 A1 | 2/2016 | Zeine | |
| 2017/0271682 A1 | 9/2017 | Matsuno et al. | |
| 2017/0271717 A1 | 9/2017 | Yamashita et al. | |

FOREIGN PATENT DOCUMENTS

| | | |
|---|---|---|
| JP | 2003-17057 | 1/2003 |
| JP | 2005-71807 | 3/2005 |
| JP | 2006-127848 | 5/2006 |
| JP | 4691966 | 6/2011 |
| JP | 5055390 | 10/2012 |
| JP | 2014-63596 | 4/2014 |
| JP | 5861635 | 2/2016 |
| JP | 2016-146338 A | 8/2016 |
| JP | 2016-146341 | 8/2016 |
| JP | 2017-174809 A | 9/2017 |
| JP | 2017-174810 A | 9/2017 |
| WO | WO 2012/017999 A1 | 2/2012 |
| WO | WO 2014/152487 A1 | 9/2014 |
| WO | 2016/038682 A1 | 3/2016 |
| WO | 2016/114141 A1 | 7/2016 |
| WO | WO 2017/135323 A1 | 8/2017 |

OTHER PUBLICATIONS

Extended European Search Report dated Jun. 6, 2017 in Patent Application No. 17157592.1.

Liumin Suo, et al. "Advanced High-Voltage Aqueous Lithium-Ion Battery Enabled by "Water-in-Bisalt" Electrolyte." Angewandte Chemie International Edition, vol. 55, No. 25, XP055375236, 2016, pp. 7136-7141.

* cited by examiner

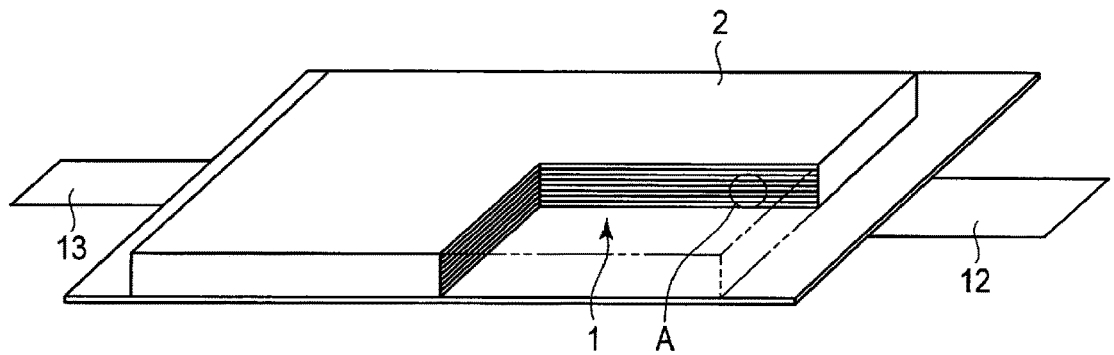
F I G. 3
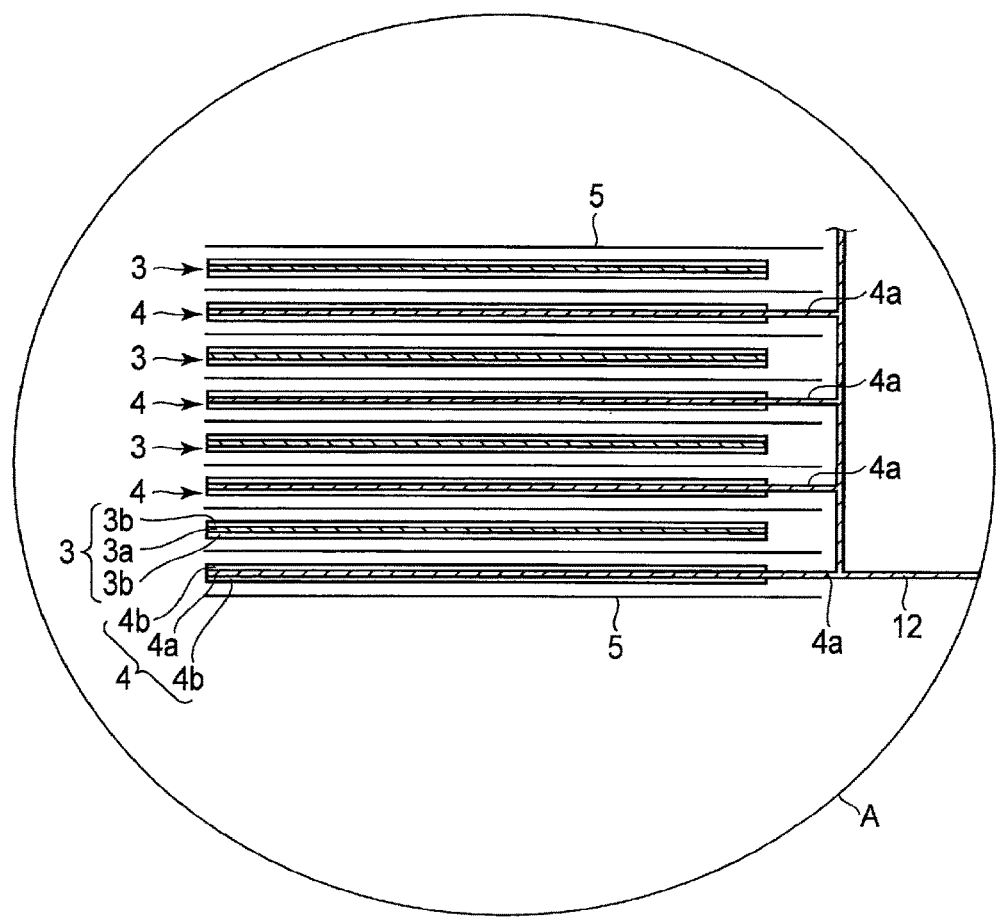
F I G. 4

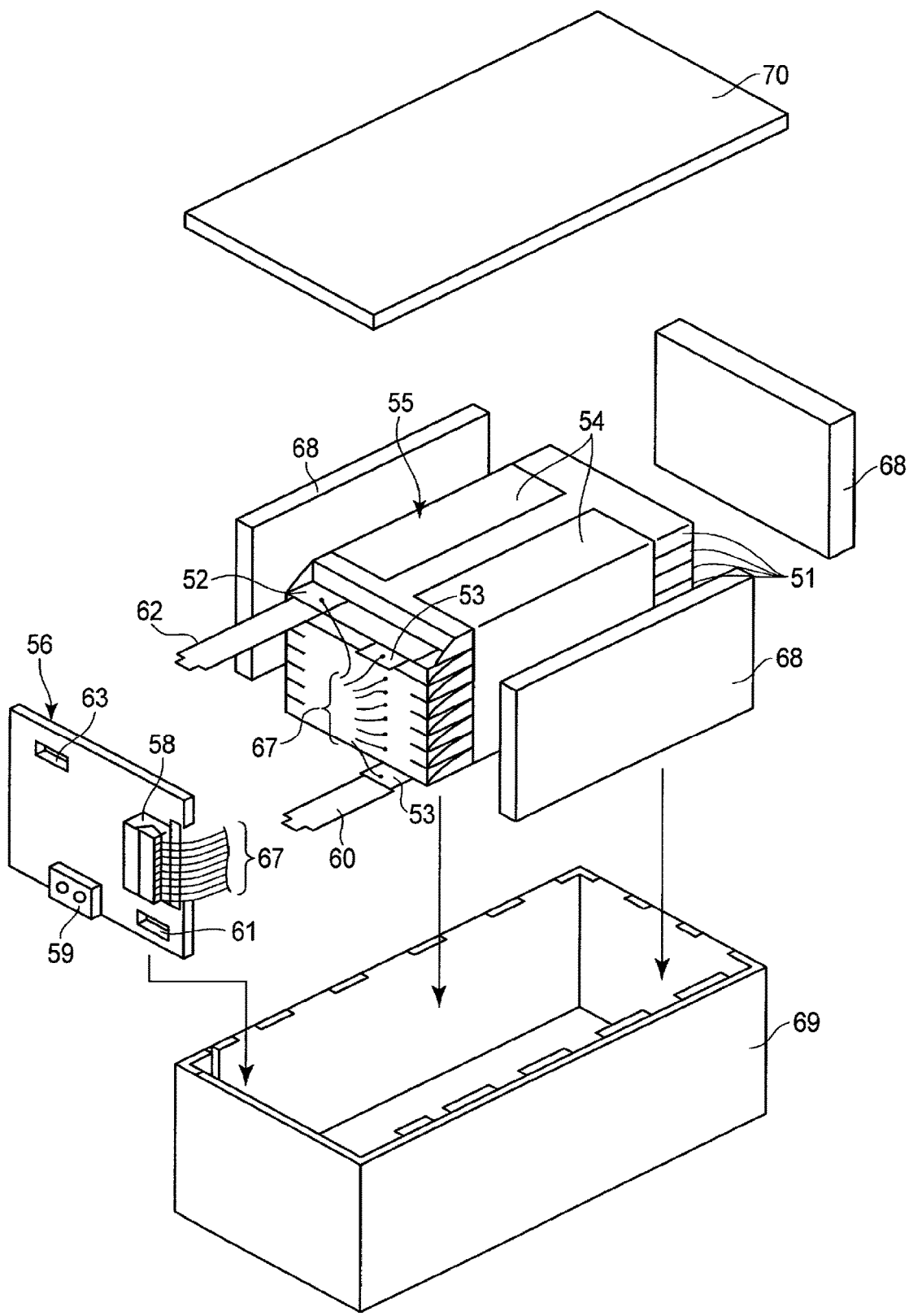
F I G. 7

SECONDARY BATTERY, BATTERY PACK, AND VEHICLE

CROSS-REFERENCE TO RELATED APPLICATION

This application is based upon and claims the benefit of priority from prior Japanese Patent Application No. 2016-182032, filed Sep. 16, 2016, the entire contents of which are incorporated herein by reference.

FIELD

Embodiments of the invention relate to a secondary battery, a battery pack, and a vehicle.

BACKGROUND

A nonaqueous electrolyte battery formed by using a carbon material or a lithium titanium oxide as a negative electrode active material and a layered oxide that contains nickel, cobalt or manganese as a positive electrode active material, particularly a lithium secondary battery has already been in practical use as a power source in a wide range of fields. Such a nonaqueous electrolyte battery is provided in a variety of forms, such as small-sized batteries for various electronic devices and large-sized batteries for electric vehicles. As an electrolyte solution of the lithium secondary battery, a nonaqueous organic solvent prepared by mixing ethylene carbonate, methylethyl carbonate and the like is used, different from a nickel-hydrogen battery or a lead storage battery. An electrolyte solution prepared using the solvent has a high oxidation resistance and a high reduction resistant property compared to those of an aqueous electrolyte solution, whereby electrolysis of the solvent hardly occurs. Thus, in the case of a nonaqueous lithium secondary battery, a high electromotive force of from 2 V to 4.5 V is attained.

Meanwhile, many organic solvents are flammable substances. Accordingly, the safety of a secondary battery formed by using an organic solvent is theoretically inferior to that of a secondary battery formed by using an aqueous solution. In order to improve the safety of a lithium secondary battery formed by using an electrolyte solution containing an organic solvent, various countermeasures have been made, however it is not exactly sufficient. In the production process of the nonaqueous lithium secondary battery, a dry environment is necessary, thereby inevitably increasing the production cost. In addition, the electrolyte solution containing an organic solvent is inferior in electrical conductivity, whereby an internal resistance of the nonaqueous lithium secondary battery is easily increased. Such problems cause large defects of electric vehicles or hybrid electric vehicles and large-sized storage batteries for stationary energy storage, where emphasis is on the battery safety and cost.

In order to solve these problems, a process of converting an electrolyte solution to an aqueous solution has been examined. In the case of the aqueous electrolyte solution, it is necessary that the potential range to perform charge/discharge of a battery is set to the potential range which does not causes an electrolysis reaction of water contained as a solvent. The electrolysis of water can be avoided by using, for example, a lithium manganese oxide as the positive electrode active material and a lithium vanadium oxide as the negative electrode active material. Although the combination of these materials results in an electromotive force of from 1 to 1.5 V, an energy density sufficient as a battery is hardly obtained.

A lithium manganese oxide is used as the positive electrode active material and a lithium titanium oxide such as $LiTi_2O_4$ or $Li_4Ti_5O_{12}$ is used as the negative electrode active material so that an electromotive force of from 2.6 to 2.7 V can be theoretically obtained. From the viewpoint of energy density, an attractive battery can be produced. A nonaqueous lithium secondary battery formed by using a combination of the positive and negative electrode materials exhibits an excellent life performance. Such a battery has already been in practical use. However, in the aqueous electrolyte solution, the lithium titanium oxide has a lithium insertion/extraction potential of about 1.5 V (vs. $Li/Li^+$) based on lithium potential, whereby electrolysis is easily caused. Particularly, in a negative electrode, hydrogen is intensely generated by electrolysis on the surface of a metal outer can electrically connected to a negative electrode current collector or the negative electrode. The influence causes the active material to be easily peeled from the current collector. Consequently, such a battery does not operate stably, whereby it is not possible to perform a satisfactory charge-discharge cycle.

BRIEF DESCRIPTION OF THE DRAWINGS

FIG. 3 is a partially cut perspective view schematically showing another example of the secondary battery according to the first embodiment;

FIG. 4 is an enlarged cross-sectional view of a portion A in FIG. 3;

FIG. 7 is an exploded perspective view schematically showing an example of the battery pack according to the second embodiment;

DETAILED DESCRIPTION

Figure 1:
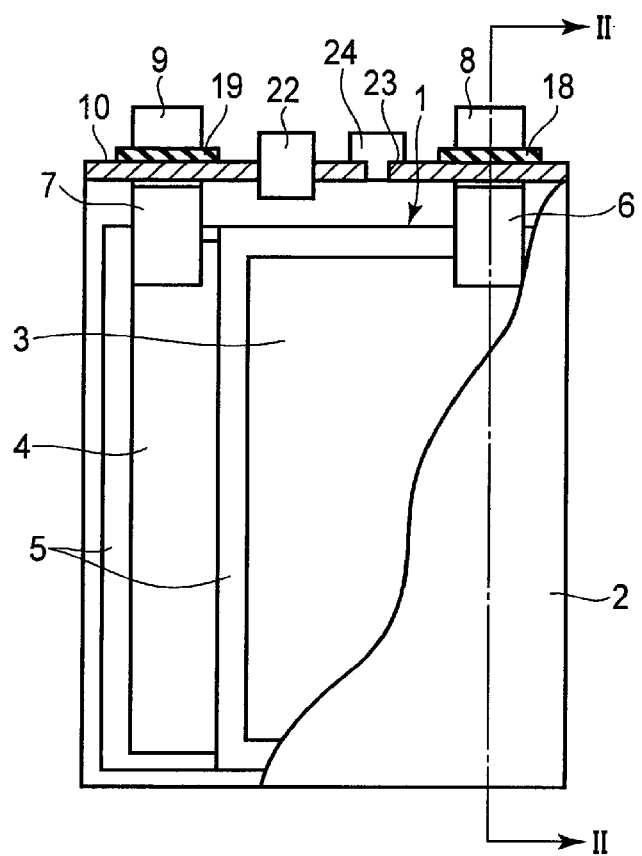
FIG. 1 is a cross-sectional view schematically showing an example of a secondary battery according to a first embodiment.

According to a first embodiment, a secondary battery is provided. The secondary battery includes a positive electrode, a negative electrode, and an electrolyte. The electrolyte contains a water-containing solvent and a nitrogen atom-containing organic sulfur compound. The concentration of the nitrogen atom-containing organic sulfur compound in the electrolyte is within a range of from 0.001 mM to 20 mM.

According to a second embodiment, a battery pack is provided. The battery pack includes the secondary battery according to the first embodiment.

According to a third embodiment, a vehicle is provided. The vehicle includes the battery pack according to the second embodiment.

First Embodiment

According to a first embodiment, a secondary battery is provided. The secondary battery includes a positive electrode, a negative electrode, and an electrolyte. The electrolyte contains a water-containing solvent and a nitrogen atom-containing organic sulfur compound. The concentration of the nitrogen atom-containing organic sulfur compound in the electrolyte is within a range of from 0.001 mM to 20 mM.

The secondary battery may further include a separator and a container which receives the positive electrode, the negative electrode, and the electrolyte.

Hereinafter, the electrolyte, the negative electrode, the positive electrode, the separator, and the container will be described in detail.

1) Electrolyte

The electrolyte contains a water-containing solvent, an electrolyte salt, and a nitrogen atom-containing organic sulfur compound. The water-containing solvent is sometimes referred to as an aqueous solvent. The electrolyte solution which contains an aqueous solvent is sometimes referred to as an aqueous electrolyte solution.

Examples of the electrolyte solution include an aqueous solution prepared by dissolving an electrolyte salt in an aqueous solvent and a gel electrolyte obtained by complexing this aqueous solution and a polymer material. Examples of the polymer material include polyvinylidene fluoride (PVdF), polyacrylonitrile (PAN), and polyethylene oxide (PEO).

The water-containing solvent may be pure water, or may be a mixed solution of water and a substance other than water and/or a mixed solvent. The substance other than water is, for example, an organic solvent. The water-containing solvent contains, for example, 50% by volume or more of water.

The aqueous solution is prepared by dissolving, for example, an electrolyte salt at a concentration of 1 to 10 mol/L in an aqueous solvent. In order to reduce the electrolysis of the electrolyte solution, the pH can be adjusted by adding LiOH or $Li_2SO_4$. The pH is preferably within a range of from 3 to 13, and more preferably within a range of from 4 to 12.

The electrolyte salt contained in the electrolyte is, for example, a lithium salt. Examples of the lithium salt include LiCl, LiBr, LiOH, $Li_2SO_4$, $LiNO_3$, LiTFSA (lithium trifluoromethane sulfonyl amide), and $LiB[(OCO)_2]_2$. Among lithium salts, LiCl is preferably contained. The lithium salt to be used may be one kind or two or more kinds.

The concentration (molar concentration) of lithium ions in the electrolyte solution is, for example, 3 M or more. The ions and water molecules are solvated by setting the concentration of lithium ions in the electrolyte solution to 6 M or more. Thus, the number of free water molecules is decreased. Accordingly, the electrolysis reaction of the aqueous solvent in the negative electrode is suppressed, thereby reducing the generation of hydrogen from the negative electrode, which is thus preferred. More preferably, the concentration is from 6 M to 10 M.

It is preferable that the kind of anion in the electrolyte solution containing the lithium salt is at least one kind selected from the group consisting of a chlorine ion ($Cl^-$), a hydroxide ion ($OH^-$), a sulfate ion ($SO_4^{2-}$), and a nitrate ion ($NO_3^-$).

As described above, the electrolyte contains an organic sulfur compound which includes a nitrogen atom as a constituent element. When the electrolyte contains the organic sulfur compound, it exhibits an effect of increasing the hydrogen overvoltage of the negative electrode and suppressing electrolysis of water. Although the reason is not certain, the present inventors consider as follows.

When a battery produced by using an aqueous electrolyte solution is energized, molecules of the nitrogen atom-containing organic sulfur compound do not decompose and adsorbs to the surface of the electrode. Thus, the organic sulfur compound adsorbed to the surface of the electrode is present as a covering layer. The covering layer inhibits a contact between water molecules and the electrode. As a result, it is considered that the hydrogen overvoltage of the negative electrode is increased. The hydrogen overvoltage is increased, thereby improving the life performance. Even when a negative electrode active material having a low operating potential is used, hydrogen is not generated, thereby producing a secondary battery with a high energy density.

Incidentally, the above energization includes, for example, energization by initial charge/discharge. The conditions of initial charge/discharge are, for example, conditions in which the constant current charge is performed at 5 C rate until the voltage reaches 2.8 V, and then the constant current discharge is performed at 1 C rate until the voltage reaches 1.5 V.

The nitrogen atom-containing organic sulfur compound is, for example, at least one compound selected from the group consisting of a sulfide compound, a disulfide compound, a thiol compound, a sulfenic acid compound, a sulfinic acid compound, a thiocarbonyl compound, a sulfimide compound, a sulfoxide compound, a sulfone compound, and a sulfonic acid compound. The organic sulfur compound may be one kind of compound or may be a mixture of two or more kinds of compounds.

It is more preferable that the organic sulfur compound is at least one compound selected from the group consisting of a sulfide compound and a sulfimide compound. In the case of using these compounds, particularly an excellent cycle life performance tends to be achieved.

Examples of the sulfide compound include amino dialkyl sulfide, alkylthio acetonitrile, azide dialkyl sulfide, thiourea, thiocarbohydrazide, guanylthiourea, dicyclohexyl thiourea, diphenyl thiourea, thioacetamide, dimethylamino thioacetamide hydrochloride and derivatives thereof, derivatives of 2-mercaptobenzothiazole, derivatives of Bismuthiol, derivatives of 2-thioacetic acid-5-mercapto-1,3,4-thiadiazole, derivatives of 2,5-dithioacetic acid-1,3,4-thiadiazole, 2-benzothiazolylthio acetic acid, 3-(2-benzothiazolylthio)propionic acid, 2-[2-(benzothiazolyl)thio]acetic acid, 2-[2-(4-methyl benzothiazolyl)thio]acetic acid, 3-[2-(benzothiazolyl)thio]propionic acid, 4-[2-(benzothiazolyl)thio]butyric acid, 2-[2-(benzothiazolyl)thio]isobutyric acid, and [2-(benzothiazolyl)thio]alkyl sulfonic acid.

Examples of the disulfide compound include dipyridyl disulfide, diammonium dithiodiglycolate, amino acids such as cystine, glutathione, and oxytocin and derivatives thereof; and lipoic acid amide.

Examples of the thiol compound include 2-aminoethane thiol, 2-(dialkylamino)thioethanethiol, hydrochlorides and hydrosulfate thereof, p-toluenesulfonate, 3-amino-5-mercapto-1,2,4-triazole, 2-amino-5-mercapto-1,3,4-thiadiazole, 6-(dibutylamino)-1,3,5-triazine-2,4-dithiol, and 1-(2-dimethylaminoethyl)-5-mercaptotetrazole; and derivatives thereof.

Examples of the sulfenic acid compound include acid amide such as alkyl sulfenamide and derivatives thereof.

Examples of the sulfinic acid compound include cysteine sulfinic acid, acid amide such as alkyl sulfinamide, and derivatives thereof.

Examples of the thiocarbonyl compound include thioisocyanate such as benzylthiocyanate, phenylisothiocyanate, benzylisothiocyanate, 3,4-difluoro phenylisothiocyanate, and 1,3-diisothiocyanate propane.

Examples of the sulfimide compound include saccharin and its sodium salt, and N-Argentio(I)sulfimide.

Examples of the sulfoxide compound include methionine sulfoxide.

Examples of the sulfone compound include 2-aminoalkyl sulfone hydrochloride, alkyl sulfonylpyridine, alkyl sulfonylpyrimidine, and alkyl sulfonylazole.

Examples of the sulfonic acid compound include an amino compound sulfate such as aminoacetonitrile sulfate.

The examples of the derivatives shown as the organic sulfur compound are derivatives in which the mercapto group contains C1 to C5 alkyl groups and to which a functional group with a carboxyl group, a sulfonic acid group, an amino group, and/or an amide group at one end is bonded.

Among the organic sulfur compounds, saccharin sodium salt, thiourea, and sodium mercapto benzothiazole propane sulfonate as derivatives of 2-mercaptobenzothiazole are preferably used. In the case where the electrolyte solution includes these compounds, an excellent life performance can be achieved.

The concentration (molar concentration) of the organic sulfur compound in the electrolyte solution is, for example, within a range of from 0.001 mM to 20 mM. When the concentration is less than 0.001 mM, the effect of increasing the hydrogen overvoltage may not be sufficient. When the concentration is greater than 20 mM, the resistance is further increased due to the organic sulfur compound adsorbed to the surface of the active material layer, thereby reducing the charge/discharge efficiency. Thus, this is not preferred.

The solubility of the organic sulfur compound in water is, for example, 10 g/100 ml or more. The upper limit of solubility is not particularly limited and is, for example, 100 g/100 ml. When the solubility to water is 10 g/100 ml or more, the dissolution of the electrolyte is not prevented and not causing reprecipitation in the solution.

The fact that the electrolyte solution taken from the battery contains the organic sulfur compound can be analyzed by, for example, liquid chromatography-mass spectrometry (LC-MS) described below. For example, an ODS (OctaDecylSilyl) column is used. The ODS column is a column filled with a filler in which an octadecyl silyl group is chemically bonded to a silica gel support. The column temperature was set to 40° C., a sample was 100-fold diluted, and 10 μL of the diluted sample was used. The flow rate was set to 0.5 mL/min. As an eluate A, a 10 mM aqueous ammonium solution is used. As an eluate B, acetonitrile is used. Under the conditions in Table 1 below, the concentrations of the eluates are graded relative to the retention time and analyzed.

TABLE 1

| Time (min.) | Eluate A (vol %) | Eluate B (vol %) |
|---|---|---|
| 0 | 100 | 0 |
| 10 | 95 | 5 |
| 15 | 92 | 8 |
| 20 | 10 | 90 |

TABLE 1-continued

| Time (min.) | Eluate A (vol %) | Eluate B (vol %) |
|---|---|---|
| 30 | 5 | 95 |
| After 30 minutes | 100 | 0 |

The components which have been eluted for a retention time of from 15 minutes to 30 minutes are subjected to the MS analysis under the conditions (detection ion: positive m/z=50-1000) so that the organic sulfur compound can be identified.

The concentration of the organic sulfur compound in the electrolyte solution is analyzed, for example, as follows.

A standard solution containing the organic sulfur compound identified by liquid chromatography-mass spectrometry (LC-MS) is provided and this solution is diluted to prepare 3 or 4 graded concentrations of standard diluted solutions. A constant amount of each of the standard diluted solutions is introduced, the chromatogram is recorded, and the peak area is measured. Then, the amount of the component to be analyzed in each of the introduced standard diluted solutions is plotted on a horizontal axis, and the peak area is plotted on a vertical axis to create a calibration curve. Based on the calibration curve previously created from the peak area of the chromatogram after introducing each sample under the same conditions, the amount of the component to be analyzed is determined and the concentration in each sample is calculated.

Further, the fact that the organic sulfur compound according to the embodiment does not decompose and adsorbs to the surface of the negative electrode is analyzed, for example, as follows.

First, the organic sulfur compound contained in the electrolyte solution is identified by infrared spectroscopy (IR), nuclear magnetic resonance (NMR) spectroscopy or the like. Then, the charged electrode is taken out and rinsed lightly with pure water. Thus, the electrolyte salt coated on the surface is removed. Thereafter, the electrode is cleaned by applying loads in pure water, such as ultrasonic cleaning, and the component adsorbed to the electrode is dissolved. The presence or absence of the organic sulfur compound is determined by analyzing the resulting solution by the LC-MS method. When the organic sulfur compound is present, its structure is identified. Thus, it is confirmed that the organic sulfur compound is not decomposed.

2) Negative Electrode

The negative electrode includes a negative electrode current collector and a negative electrode active material layer which is formed on one side or both sides of the negative electrode current collector and contains an active material, a conductive agent, and a binder.

The negative electrode current collector is preferably an aluminum foil or an aluminum alloy foil containing at least one kind of elements selected from Mg, Ti, Zn, Mn, Fe, Cu, and Si. The aluminum alloy foil may contain only one kind or two or more kinds of these elements. The negative electrode current collector may be in another form such as a porous body or mesh.

The negative electrode active material layer is disposed on at least one side of the negative electrode current collector. For example, the negative electrode active material layer may be disposed on one side of the negative electrode current collector or the negative electrode active material layer may be disposed on one side and the reverse side of the negative electrode current collector.

As the negative electrode active material, a titanium-containing oxide such as titanium oxide, lithium titanium oxide, niobium titanium oxide or sodium niobium titanium oxide may be used. The Li insertion potential of the titanium-containing oxide is preferably from 1 V (vs. Li/Li$^+$) to 3 V (vs. Li/Li$^+$). The negative electrode active material may contain one kind or two or more kinds of the titanium-containing oxides.

Examples of the titanium oxide include a titanium oxide having a monoclinic structure, a titanium oxide having a rutile structure, and a titanium oxide having an anatase structure. As for the titanium oxide having each of the crystal structures, the composition before charge is $TiO_2$ and the composition after charge is $Li_xTiO_2$ (x is 0≤x≤1). Further, the structure of the titanium oxide having a monoclinic structure before charge is $TiO_2$ (B).

Examples of the lithium titanium oxide include a lithium titanium oxide having a spinel structure (e.g., $Li_{4+x}Ti_5O_{12}$ (−1≤x≤3); and a lithium titanium oxide having a ramsdellite structure (e.g., $Li_{2+x}Ti_3O_7$ (−1≤x≤3), $Li_{1+x}Ti_2O_4$ (0≤x≤1), $Li_{1.1+x}Ti_{1.8}O_4$ (0≤x≤1), $Li_{1.07+x}Ti_{1.86}O_4$ (0≤x≤1), and $Li_x$-$TiO_2$ (0<x≤1). The lithium titanium oxide may be a lithium-titanium composite oxide into which a dopant is introduced.

Examples of the niobium titanium oxide include a niobium titanium oxide represented by $Li_aTiM_bNb_{2±β}O_{7±σ}$ (0≤a≤5, 0≤b≤0.3, 0≤β≤0.3, 0≤σ≤0.3, where M is at least one kind of elements selected from the group consisting of Fe, V, Mo, and Ta).

Examples of the sodium niobium titanium oxide include an orthorhombic Na-containing niobium titanium composite oxide represented by $Li_{2+v}Na_{2-w}M1_xTi_{6-y-z}Nb_yM2_zO_{14+δ}$ (0≤v≤4, 0≤w<2, 0≤x<2, 0≤y<6, 0≤z<3, −0.5≤δ≤0.5, M1 includes at least one selected from Cs, K, Sr, Ba, and Ca, and M2 includes at least one selected from Zr, Sn, V, Ta, Mo, W, Fe, Co, Mn, and Al.

Examples of the compound preferred as the negative electrode active material include a titanium oxide having an anatase structure, a titanium oxide having a monoclinic structure, and a lithium titanium oxide having a spinel structure. These compounds have a Li insertion potential of from 1.4 V (vs. Li/Li$^+$) to 2 V (vs. Li/Li$^+$). Thus, each of them is used in combination with, for example, a lithium manganese oxide as the positive electrode active material so that a high electromotive force can be obtained. The secondary battery according to the embodiment includes an electrolyte solution which contains the organic sulfur compound. Thus, as described above, the organic sulfur compound is adsorbed to the surface of the negative electrode during the energizing process. Therefore, as described above, the titanium-containing oxide having a low operating potential is used as the negative electrode active material so that generation of hydrogen can be suppressed. The lithium titanium oxide having a spinel structure is preferred because it exhibits little volume change in the charge-discharge reaction.

The negative electrode contains a negative electrode active material, for example, in the form of particles. Negative electrode active material particles may be single primary particles, secondary particles which are aggregates of the primary particles, or a mixture of single primary particles and secondary particles. The shape of the particles is not particularly limited, and may be, for example, a spherical shape, an elliptical shape, a flat shape or a fibrous shape.

In the case where the negative electrode active material particles are granular and amorphous, the electric charge density of the protrusion (end of the sharp-pointed portion) is increased during the energizing process. The molecules of the organic sulfur compound are easily adsorbed to this portion because adsorption of molecules of the organic sulfur compound is caused by an electrostatic interaction. As a result, adsorption spots may be formed on a part of the surface of the negative electrode. In other words, a portion with many molecules adsorbed and a portion with a few molecules adsorbed may be present on the surface of the negative electrode. Therefore, the roughness of the surface of the negative electrode active material particles is preferably small so as not to form a portion with very low adsorption of molecules. The portion with low adsorption of molecules is present on the surface of the negative electrode, thereby easily generating hydrogen from the portion.

The secondary particles of the negative electrode active material preferably have an average particle size (diameter) of 3 μm or more, more preferably of 5 μm to 20 μm. When the average particle size is within this range, the surface area of the active material is small, thereby improving an effect of suppressing generation of hydrogen.

The negative electrode active material having secondary particles with an average particle size of 3 μm or more is produced by, for example, the following method. First, an active material precursor having an average particle size of 1 μm or less is produced by the synthesis of raw materials of the active material. Thereafter, the active material precursor is sintered and the resulting product is ground using a grinder such as a ball mill or jet mill. After that, the active material precursor is aggregated in the sintering process so that the secondary particles are grown to have a large particle size.

It is preferable that the primary particles of the negative electrode active material have an average particle size of 1 μm or less. Accordingly, the diffusion length of lithium ions in the active material becomes shorter and the specific surface area becomes larger. Thus, an excellent high input performance (rapid charge) is attained. Meanwhile, when the average particle size is small, the particles are easily aggregated. The distribution of the electrolyte solution is inclined toward the negative electrode, which may cause depletion of the electrolyte in the positive electrode. Therefore, it is preferable that the lower limit of the average particle size of the primary particles of the negative electrode active material is 0.001 μm. It is further preferable that the average particle size is from 0.1 μm to 0.8 μm.

The negative electrode active material has, for example, a specific surface area (measured by the BET method based on $N_2$ adsorption) of from 3 m$^2$/g to 200 m$^2$/g. Accordingly, it is possible to further increase the affinity of the negative electrode for the electrolyte solution. It is more preferable that the negative electrode has a specific surface area of from 3 m$^2$/g to 50 m$^2$/g. The negative electrode active material layer may be a porous layer containing a negative electrode active material, a conductive agent, and a binder which is formed on the current collector. When the specific surface area is less than 3 m$^2$/g, the aggregation of particles is marked, thereby reducing the affinity of the negative electrode for the nonaqueous electrolyte. As a result, the interface resistance of the negative electrode is increased, thereby reducing output characteristics and charge-and-discharge cycle characteristics. Meanwhile, when the specific surface area is greater than 50 m$^2$/g, the distribution of the nonaqueous electrolyte is inclined toward the negative electrode. This causes shortage of the nonaqueous electrolyte in the positive electrode. Consequently, it is not possible to achieve an improvement in output characteristics and charge-and-discharge cycle characteristics.

The porosity of the negative electrode (excluding the current collector) is preferably within a range of from 20% to 50%. Accordingly, it is possible to produce a negative electrode having an excellent affinity of the negative electrode for the electrolyte solution and a high density. More preferably, the porosity is within a range of from 25% to 40%.

If necessary, the conductive agent is added in order to improve the current collection performance and suppress the contact resistance of the active material to the current collector. Examples of the conductive agent include carbonaceous substances such as acetylene black, ketjen black, graphite, and coke. The conductive agent may be used singly, or in mixture of two or more kinds thereof.

The binder functions to bond the active material and the conductive agent to be adhered to the current collector. As the binder, for example, at least one selected from the group consisting of polytetrafluoroethylene (PTFE), polyvinylidene fluoride (PVdF), a cellulose-based material (e.g., sodium carboxymethyl cellulose (CMC)), fluorine-based rubber, styrene butadiene rubber, an acrylic resin or its copolymer, polyacrylic acid, and polyacrylonitrile may be used, but is not limited thereto. The binder may be used singly, or in mixture of two or more kinds thereof.

As for the compounding ratio of the negative electrode active material, the conductive agent, and the binder in the negative electrode active material layer, it is preferable that the content of the negative electrode active material is from 70% by weight to 95% by weight, the content of the negative electrode conductive agent is from 3% by weight to 20% by weight, the content of the binder is from 2% by weight to 10% by weight. When the compounding ratio of the conductive agent is 3% by weight or more, the electrical conductivity of the negative electrode can be made favorable. When the compounding ratio is 20% by weight or less, it is possible to reduce the decomposition of the electrolyte on the surface of the conductive agent. When the compounding ratio of the binder is 2% by weight or more, sufficient electrode strength is obtained. When the compounding ratio is 10% by weight or less, it is possible to reduce the insulating part of the electrode.

The negative electrode is produced by, for example, the following method. First, a negative electrode active material, a conductive agent, and a binder are suspended in a solvent to prepare a slurry. Then, the slurry is applied to one side or both sides of a negative electrode current collector. Here, a cover layer is previously formed on the negative electrode current collector by the above method and the resulting collector is used. The coating film on the negative electrode current collector is dried to form a negative electrode active material layer. Thereafter, the negative electrode current collector and the negative electrode active material layer formed on the negative electrode current collector is pressed. A pellet containing the negative electrode active material, the conductive agent, and the binder may be used for the negative electrode active material layer.

3) Positive Electrode

The positive electrode includes a positive electrode current collector and a positive active material layer which is formed on one side or both sides of the positive electrode current collector and contains an active material, a conductive agent, and a binder.

The positive electrode current collector is formed of a metal such as stainless steel, Al or Ti. The positive electrode current collector may be in the form of porous body or mesh. In order to prevent corrosion of the current collector due to the reaction of the current collector with the electrolyte solution, the surface of the current collector may be coated with a dopant. Preferably, the positive electrode current collector is, for example, a Ti foil excellent in corrosion resistance and oxidation resistance. In the case of using a lithium salt ($Li_2SO_4$) used for the electrolyte described below, corrosion does not progress, and thus aluminum (Al) may be used as the positive electrode current collector.

A positive electrode active material allowing lithium to be inserted thereinto and extracted therefrom may be used. The positive electrode may contain one kind or two or more kinds of positive electrode active materials. Examples of the positive electrode active material include a lithium manganese composite oxide, a lithium nickel composite oxide, a lithium cobalt aluminum composite oxide, a lithium nickel cobalt manganese composite oxide, a spinel type lithium manganese nickel composite oxide, a lithium manganese cobalt composite oxide, a lithium iron oxide, a fluorinated lithium iron sulfate, and a phosphate compound having an olivine crystal structure (e.g., $Li_xFePO_4$ ($0<x\leq1$), $Li_xMnPO_4$ ($0<x\leq1$)). The phosphate compound having an olivine crystal structure is excellent in thermal stability.

Examples of the positive electrode active material by which a high positive electrode potential is obtained will be described below. Examples thereof include $LiMn_2O_4$ ($0<x\leq1$) having a spinel structure, a lithium manganese composite oxide (e.g., $Li_xMnO_2$ ($0<x\leq1$)), a lithium nickel aluminum composite oxide (e.g., $Li_xNi_{1-y}Al_yO_2$ ($0<x\leq1$, $0<y<1$)), a lithium cobalt composite oxide (e.g., $Li_xCoO_2$ ($0<x\leq1$), a lithium nickel cobalt composite oxide (e.g., $Li_xNi_{1-y-z}Co_yMn_zO_2$ ($0<x\leq1$, $0<y<1$, $0\leq z<1$), a lithium manganese cobalt composite oxide (e.g., $Li_xMn_yCo_{1-y}O_2$ ($0<x\leq1$, $0<y<1$), a spinel type lithium manganese nickel composite oxide (e.g., $Li_xMn_{2-y}Ni_yO_4$ ($0<x\leq1$, $0<y<2$)), a lithium phosphorus oxide having an olivine structure (e.g., $Li_xFePO_4$ ($0<x\leq1$), $Li_xFe_{1-y}Mn_yPO_4$ ($0<x\leq1$, $0\leq y\leq1$), $Li_xCoPO_4$ ($0<x\leq1$)), and a fluorinated iron sulfate (e.g., $Li_xFeSO_4F$ ($0<x\leq1$)).

The positive electrode active material is preferably at least one selected from the group consisting of a lithium cobalt composite oxide, a lithium manganese composite oxide, and a lithium phosphorus oxide having an olivine structure. The operating potential of each of the active materials is from 0.2 V (vs. $Li/Li^+$) to 0.8 V (vs. $Li/Li^+$), which is a high level. Further, the operating potential of each of the active materials exists near the equilibrium potential for oxygen evolution, thereby stably performing a charge/discharge cycle, which is preferred. These positive electrode active materials are used in combination with negative electrode active materials such as the spinel type lithium titanate and the anatase type titanium oxide so that a high battery voltage is obtained.

The positive electrode contains the positive electrode active material, for example, in the form of particles. The positive electrode active material particles may be single primary particles, secondary particles which are aggregates of the primary particles, or a mixture of single primary particles and secondary particles. The shape of the particles is not particularly limited, and may be, for example, a spherical shape, an elliptical shape, a flat shape or a fibrous shape.

The positive electrode active material particles may be single primary particles, secondary particles which are aggregates of the primary particles, or may include single primary particles and secondary particles. The primary particles of the positive electrode active material preferably have an average particle size (diameter) of 10 µm or less, more preferably of 0.1 µm to 5 µm. The secondary particles of the positive electrode active material preferably have an average particle size (diameter) of 100 µm or less, more preferably of 10 µm to 50 µm.

If necessary, the conductive agent is added in order to improve the current collection performance and suppress the contact resistance of the active material to the current collector. Examples of the conductive agent include carbonaceous substances such as acetylene black, ketjen black, graphite, and coke. The conductive agent may be used singly, or in mixture of two or more kinds thereof.

Examples of the binder include polytetrafluoroethylene (PTFE), polyvinylidene fluoride (PVdF), fluorine-based rubber, ethylene-butadiene rubber, polypropylene (PP), polyethylene (PE), carboxymethylcellulose (CMC), polyimide (PI), and polyacrylimide (PAI). The binder may be used singly, or in mixture of two or more kinds thereof.

As for the compounding ratio of the positive electrode active material, the conductive agent, and the binder in the positive electrode active material layer, it is preferable that the content of the positive electrode active material is from 70% by weight to 95% by weight, the content of the positive electrode conductive agent is from 3% by weight to 20% by weight, the content of the binder is from 2% by weight to 10% by weight. When the compounding ratio of the conductive agent is 3% by weight or more, the electrical conductivity of the positive electrode can be made favorable. When the compounding ratio of the conductive agent is 20% by weight or less, the decomposition of the electrolyte on the surface of the conductive agent can be reduced. When the compounding ratio of the binder is 2% by weight or more, sufficient electrode strength can be attained. When the compounding ratio of the binder is 10% by weight or more, the insulating part of the electrode can be reduced.

The positive electrode is produced by, for example, the following method. First, a positive electrode active material, a conductive agent, and a binder are suspended in a solvent to prepare a slurry. Then, the slurry is applied to one side or both sides of a positive electrode current collector. The coating film on the positive electrode current collector is dried to form a positive electrode active material layer. Thereafter, the positive electrode current collector and the positive electrode active material layer formed on the positive electrode current collector are pressed. A pellet containing the positive electrode active material, the conductive agent, and the binder may be used for the positive electrode active material layer.

4) Separator

A separator may be disposed between the positive electrode and the negative electrode. Examples of the separator include non-woven fabrics, films, and paper. Examples of a constitution material of the separator include polyolefins such as polyethylene and polypropylene; and cellulose. Preferable examples of the separator include cellulose fiber-containing non-woven fabrics and polyolefin fiber-containing porous films.

The porosity of the separator is preferably 60% or more. The fiber diameter is preferably 10 µm or less. When the fiber diameter is set to 10 µm or less, the affinity of the electrolyte with the separator is improved, thereby reducing the battery resistance. The fiber diameter is more preferably 3 µm or less. A cellulose fiber-containing non-woven fabric having a porosity of 60% or more has an excellent electrolyte impregnation property. Such a separator is used so that a high output performance can be exerted in a range of from low to high temperatures. Further, the non-woven fabric does not react with the negative electrode during long-term charge storage, float charge or over-charge, thereby causing no short circuit between the negative electrode and the positive electrode due to the formation of lithium metal dendrites. The porosity of the separator is more preferably from 62% to 80%.

It is preferable that the separator has a thickness of from 20 µm to 100 µm and a density of from 0.2 $g/cm^3$ to 0.9 $g/cm^3$. When the thickness and the density of the separator are within the above ranges respectively, the balance between the mechanical strength and a reduction in resistance of the battery can be adjusted, making it possible to provide a secondary battery which has a high output and is resistant to the development of internal short circuits. Also, a reduction in thermal shrinkage of the separator at high temperatures and a favorable high-temperature storage performance can be attained.

5) Container

As the container that receives the positive electrode, negative electrode, and electrolyte, a metal container, a laminate film container or a resin container which is made of polyethylene or polypropylene may be used.

As the metal container, a metal can which is made of nickel, iron or stainless steel and has a rectangular or cylindrical shape may be used.

The plate thickness of each of the resin container and the metal container is preferably from 0.05 mm to 1 mm. The plate thickness is more preferably 0.5 mm or less and still more preferably 0.3 mm or less.

Examples of the laminate film include a multilayer film formed by covering a metal layer with a resin layer. Examples of the metal layer include a stainless steel foil, an aluminum foil, and an aluminum alloy foil. As the resin layer, a polymer such as polypropylene (PP), polyethylene (PE), nylon or polyethylene terephthalate (PET) may be used. The thickness of the laminate film is preferably from 0.01 mm to 0.5 mm and more preferably 0.2 mm or less.

The secondary battery according to the embodiment may have various shapes such as a rectangular shape, a cylindrical shape, a flat shape, a thin shape, and a coin shapes. Further, the secondary battery may have a bipolar structure. As a result, a plural of cells connected in series can be produced by one cell, which is advantageous.

Hereinafter, an example of the secondary battery according to the embodiment will be described with reference to FIGS. 1 to 5.

Figure 2:
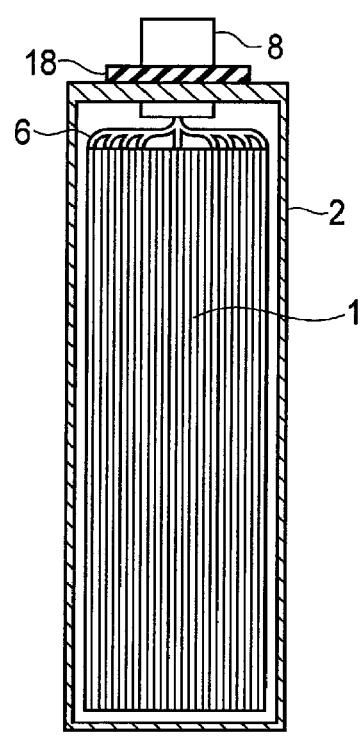
FIG. 2 is a cross-sectional view along the II-II line of the secondary battery shown in FIG. 1.

FIG. 1 is a cross-sectional view schematically showing an example of a rectangular secondary battery according to the embodiment. FIG. 2 is a cross-sectional view along the II-II line of the rectangular secondary battery shown in FIG. 1.

An electrode group 1 is received in a rectangular cylindrical metal container 2. The electrode group 1 has a structure in which a plurality of positive electrodes 3, a plurality of negative electrodes 4, and a plurality of separators 5 are stacked in the order of the positive electrode 3, the separator 5, the negative electrode 4, and the separator 5. Alternatively, the electrode group 1 may have a spirally wound flat structure in which the separator 5 is provided between the positive electrode 3 and the negative electrode 4. In the case where the electrode group 1 has either of the structures, it is preferable that the separator 5 is disposed on the outermost layer of the electrode group 1 in order to avoid the contact between the electrode and the metal container 2. An electrolyte (not shown) is supported by the electrode group 1.

As shown in FIG. 2, band-shaped positive electrode tabs 6 are electrically connected to a plural of points of the positive electrode 3 located at the end surface of the electrode group 1. Although not illustrated, band-shaped negative electrode tabs 7 are electrically connected to a plural of points of the negative electrode 4 located at the end surface. The positive electrode tabs 6 are electrically connected to a positive electrode lead 8 in a bundled state. A positive electrode terminal is constituted of the positive electrode tab 6 (positive electrode inner terminal) and the positive electrode lead 8 (positive electrode external terminal). The negative electrode tabs 7 are electrically connected to a negative electrode lead 9 in a bundled state. A negative electrode terminal is constituted of the negative electrode tab 7 (negative electrode inner terminal) and the negative electrode lead 9 (negative electrode external terminal).

A metal sealing plate 10 is secured to an opening part of the metal container 2 by welding. The positive electrode lead 8 and the negative electrode lead 9 are respectively drawn externally from each drawing hole formed in the sealing plate 10. A positive electrode gasket 18 and a negative electrode gasket 19 are respectively disposed on the inner periphery surface of each drawing hole of the sealing plate 10 in order to avoid short circuits developed by the contact between the positive electrode lead 8 and sealing plate 10, and by the contact between the negative electrode lead 9 and sealing plate 10. The airtightness of the rectangular secondary battery can be ensured by disposing the positive electrode gasket 18 and the negative electrode gasket 19.

A control valve 22 (safety valve) is disposed in the sealing plate 10. In the case where the internal pressure of a battery cell is increased due to gas generated by electrolysis of an aqueous solvent, it is possible to diffuse the generated gas from the control valve 22 to the outside. The control valve 22 to be used is, for example, a return control valve which operates when the internal pressure becomes higher than a set value and which functions as a sealing plug when the internal pressure decreases. Alternatively, a non-return valve may be used, where once it is operated, its function as the sealing plug is not recovered. In FIG. 2, the control valve 22 is disposed in the center of the sealing plate 21, and the control valve 22 may be located at the end of the sealing plate 21. The control valve 22 may be omitted.

An injection port 23 is formed in the sealing plate 21. An electrolyte is poured through the injection port 23. The injection port 23 is closed by a sealing plug 24 after pouring the electrolyte. The injection port 23 and the sealing plug 24 may be omitted.

FIG. 3 is a partially cut perspective view schematically showing another example of the secondary battery according to the embodiment. FIG. 4 is an enlarged cross-sectional view of a portion A in FIG. 3. FIGS. 3 and 4 show an example of a secondary battery which is formed by using a container member of a laminate film as a container.

A stack-type electrode group 1 is received in a bag-shaped container 2 formed of a laminate film including a metal layer interposed between two resin films. As shown in FIG. 4, the stack-type electrode group 1 has a structure in which the positive electrode 3 and the negative electrode 4 are alternately stacked with the separator 5 interposed therebetween. A plural of the positive electrodes 3 is present and each of them includes a current collector 3a and a positive active material layer 3b formed on both sides of the current collector 3a. A plural of negative electrodes 4 is present and each of them includes a current collector 4a and a negative electrode active material layer 4b formed on both sides of the current collector 4a. In the current collector 4a of each of the negative electrodes 4, one side is protruded from the positive electrode 3. The protruded current collector 4a is electrically connected to a band-shaped negative electrode terminal 12. The end of the band-shaped negative electrode terminal 12 is externally drawn from the container 2. Although not illustrated, in the current collector 3a of the positive electrode 3, one side located at the opposite side of the protruded side of the current collector 4a protrudes from the negative electrode 4. The current collector 3a protruded from the negative electrode 4 is electrically connected to a band-shaped positive electrode terminal 13. The end of the band-shaped positive electrode terminal 13 is located at the opposite side of the negative electrode terminal 12 and externally drawn from one side of the container 2.

Each of the secondary batteries shown in FIGS. 3 and 4 may have a safety valve that discharges the hydrogen gas generated in the container to the outside. The safety valve may be either a return control valve which operates when the internal pressure becomes higher than a set value and which functions as a sealing plug when the internal pressure decreases, or a non-return valve where once it is operated, its function as the sealing plug is not recovered. Each of the secondary batteries shown in FIGS. 1 to 4 is a closed type battery, and may be an open type battery in the case of including a circulation system that converts hydrogen gas to water.

A battery module may be formed of the secondary batteries according to the embodiment.

Examples of the battery module include those including a plural of unit cells electrically connected in series, in parallel, or in a combination of in series and in parallel; a unit constituted of a plural of unit cells electrically connected in series; those including a unit constituted of a plural of unit cells electrically connected in parallel; and a unit constituted of a plural of unit cells electrically connected in a combination of in series and in parallel.

The battery module may be received in a cabinet. As the cabinet, a metal can which is made of an aluminum alloy, iron or stainless steel or a plastic container may be used. The thickness of the container is preferably 0.5 mm or more.

Examples of the form of serial or parallel electrical connection of a plural of secondary batteries include serial or parallel electrical connection of a plural of secondary batteries each having a container, and serial or parallel electrical connection of a plural of secondary electrode groups received in a common cabinet. According to a specific example of the former, a plural of secondary batteries whose positive and negative electrode terminals are connected by a metal bus bar (e.g., aluminum, nickel, copper). According to a specific example of the latter, a plural of electrode groups are received in one cabinet with electrochemically insulated by a diaphragm, and these electrode groups are electrically connected in series. Five to seven batteries are electrically connected in series so that a battery module having favorable voltage compatibility with the lead storage battery can be realized. In order to increase the voltage compatibility with the lead storage battery, it is preferable that five or six unit cells are configured to be connected in series.

An example of the battery module will be described with reference to FIG. 5.

Figure 5:
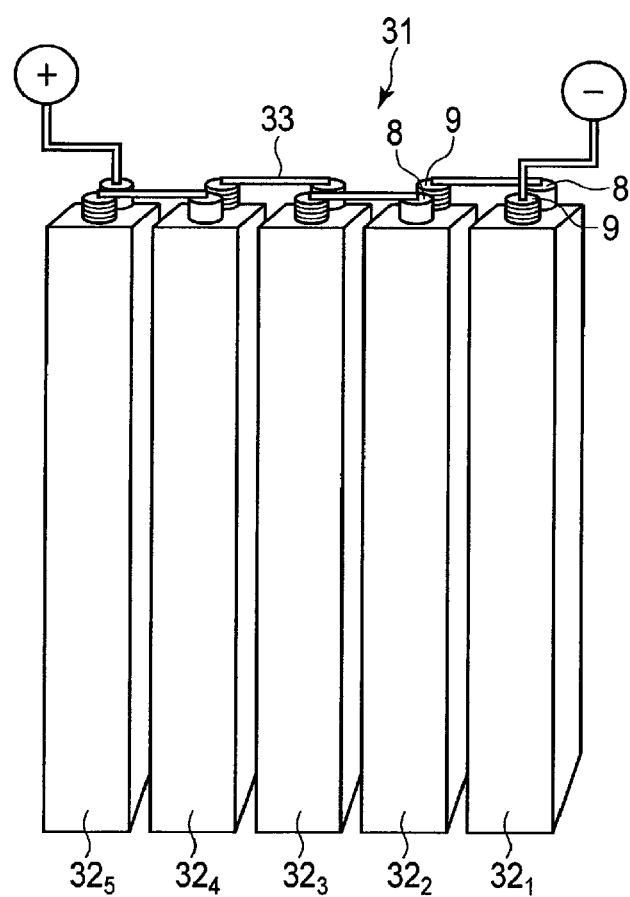
FIG. 5 is a perspective view schematically showing an example of a battery module according to the first embodiment.

FIG. 5 is a perspective view schematically showing an example of a battery module which includes a plural of the secondary batteries according to the embodiment as a unit cell. A battery module 31 includes the rectangular secondary batteries (e.g., batteries $32_1$ to $32_5$ described in FIGS. 1 and 2). The positive electrode lead 8 of the battery $32_1$ is electrically connected to the negative electrode lead 9 of the battery $32_2$ located adjacent to the battery $32_1$ through a lead 33. Further, the positive electrode lead 8 of the battery $32_2$ is electrically connected to the negative electrode lead 9 of the battery $32_3$ located adjacent to the battery $32_2$ through the lead 33. Thus, the batteries $32_1$ to $32_5$ are connected in series.

Five of the secondary batteries according to the embodiment are connected in series so that excellent compatibility with a lead storage battery can be realized. Therefore, a battery module formed by connecting five secondary batteries in series may be used as an alternative power source of the lead storage battery.

According to the secondary battery according to the first embodiment, the electrolyte contains a water-containing solvent, an electrolyte salt, and a nitrogen atom-containing organic sulfur compound, and the concentration of the nitrogen atom-containing organic sulfur compound in the electrolyte is within a range of from 0.001 mM to 20 mM. Thus, it is possible to suppress the generation of hydrogen from the current collector and achieve an excellent life performance.

Second Embodiment

According to a second embodiment, a battery pack is provided. The battery pack includes the secondary battery according to the first embodiment. The battery pack may include a circuit part which controls charge/discharge of the secondary battery.

The battery pack may include one or a plural of the secondary batteries (unit cells) according to the first embodiment as described above. The secondary batteries included in the battery pack may be electrically connected in series, in parallel, or in a combination of in series and in parallel. In the case where a battery module is formed of the secondary batteries, the battery module described in the first embodiment may be used.

The battery pack may further include a protective circuit. The protective circuit controls charge/discharge of the secondary battery. Alternatively, a circuit included in a device using as the battery pack as a power source (e.g., an electronic device or an automobile) may be used as the protective circuit of the battery pack.

Further, the battery pack may further include an external power distribution terminal. The external power distribution terminal outputs a current from the secondary battery to outside and inputs a current to the secondary battery. In other words, when the battery pack is used as a power source, the current is supplied to the outside through the external power distribution terminal. When charging the battery pack, charging current (including a regenerative energy caused by, for example, power of automobile) is supplied to the battery pack through the external power distribution terminal.

The circuit part may be connected to the secondary battery before the battery pack is mounted in a vehicle such as an automobile or an electronic device. Alternatively, the circuit part included in a vehicle such as an automobile may be connected to the secondary battery included in the battery pack. The battery pack of the embodiment includes any form.

Figure 6:
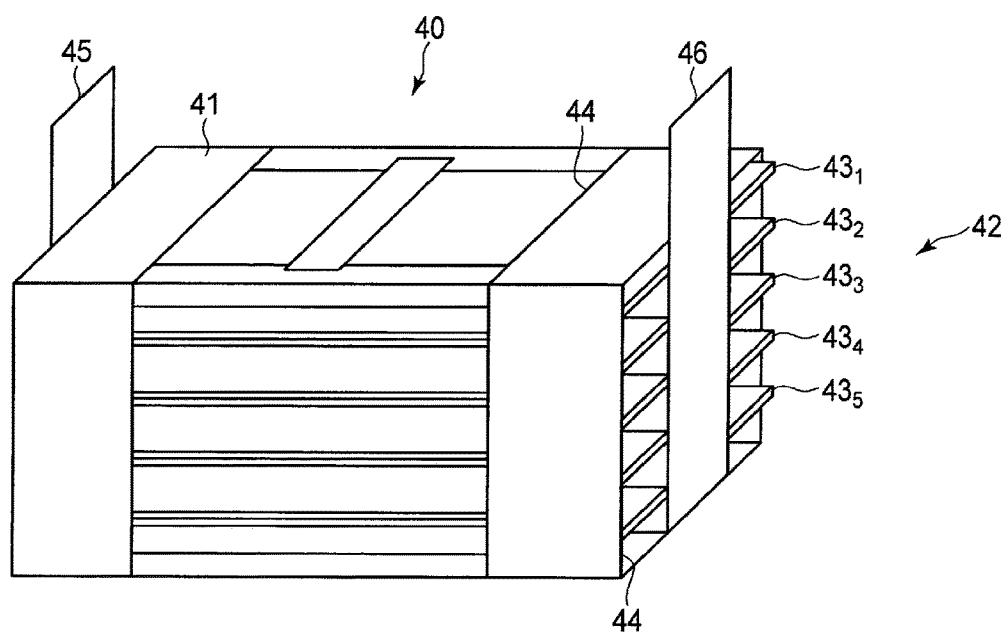
FIG. 6 is a perspective view schematically showing an example of a battery pack according to a second embodiment.

An example of the battery pack according to the embodiment will be described in detail with reference to FIGS. 6 and 8. FIG. 6 is a perspective view showing an example of the battery pack according to the embodiment.

A battery pack 40 includes a battery module formed of secondary batteries shown in FIGS. 3 and 4. The battery pack 40 includes a cabinet 41 and a battery module 42 received in the cabinet 41. The battery module 42 is formed by electrically connecting a plural (e.g., five) of secondary batteries $43_1$ to $43_5$. The secondary batteries $43_1$ to $43_5$ are stacked in the thickness direction. The top and four side surfaces of the cabinet 41 have openings 44. The protruded side surfaces of the positive and negative electrode terminals 12 and 13 of the secondary batteries $43_1$ to $43_5$ are exposed to the openings 44 of the cabinet 41. An output positive electrode terminal 45 of the battery module 42 has a band-shape. One end of the output positive electrode terminal 45 is electrically connected to at least one positive electrode terminal 12 of the secondary batteries $43_1$ to $43_5$, and the other end of the terminal protrudes from the opening 44 of the cabinet 41 and projects from the top of the cabinet 41. Meanwhile, an output negative electrode terminal 46 of the battery module 42 has a band-shape. One end of the output negative electrode terminal 46 is electrically connected to at least one negative electrode terminal 13 of the secondary batteries $43_1$ to $43_5$, and the other end of the terminal protrudes from the opening 44 of the cabinet 41 and projects from the top of the cabinet 41.

Another example of the battery pack will be described in detail with reference to FIGS. 7 and 8. FIG. 7 is an exploded perspective view of a battery pack. FIG. 8 is a block diagram showing an electric circuit of the battery pack of FIG. 7.

A plural of unit cells 51 constituted of flat-shaped lithium secondary batteries is stacked in such a manner that a negative electrode terminal 52 and a positive electrode terminal 53 extending out are oriented in the same direction, and bound by an adhesive tape 54 to form a battery module 55. As shown in FIG. 8, the unit cells 51 are electrically connected in series with each other.

A printed wiring board 56 is disposed opposing to the side surface of the unit cells 51 from which the negative electrode terminal 52 and the positive electrode terminal 53 are extended. As shown in FIG. 8, a thermistor 57, a protective circuit 58, and an external power distribution terminal 59 are mounted on the printed wiring board 56. Incidentally, an insulating plate (not shown) is attached to the surface of the printed wiring board 56 which faces the battery module 55, thereby avoiding unnecessary connection of the wiring line of the battery module 55 with the printed wiring board 56.

A positive electrode lead 60 is connected to the positive electrode terminal 53 which is located at the undermost layer of the battery module 55, and its tip is inserted to and electrically connected to a positive electrode connector 61 of the printed wiring board 56. A negative electrode lead 62 is connected to the negative electrode terminal 52 which is located at the uppermost layer of the battery module 55, and its tip is inserted to and electrically connected to a negative electrode connector 63 of the printed wiring board 56. These connectors 61 and 63 are connected to the protective circuit 58 via wiring lines 64 and 65 that are formed on the printed wiring board 56.

The thermistor 57 detects the temperature of each of the unit cells 51 and sends the detection signal to the protective circuit 58. The protective circuit 58 can shut down a plus wiring line 66a and a minus wiring line 66b between the protective circuit 58 and the external power distribution terminal 59 under a predetermined condition. The predetermined condition refers to, for example, the time at which the temperature detected by the thermistor 57 reaches a predetermined temperature or more. Further, the predetermined condition, refers to the time at which over-charge, over-discharge, and over-current of the unit cells 51 are detected. The over-charge detection is performed on each of the unit cells 51 or the battery module 55. In the case where each of the unit cells 51 is detected, the battery voltage may be detected or the positive electrode potential or the negative electrode potential may be detected. In the case of the latter, a lithium electrode to be used as a reference electrode is inserted into each of the unit cells 51. In the case of FIGS. 7 and 8, wiring lines 67 for voltage detection are connected to the unit cells 51 and detection signals are sent to the protective circuit 58 through the wiring lines 67.

Protective sheets 68 made of rubber or resin are formed on three side surfaces of the battery module 55 except for the side face from which the positive electrode terminal 53 and the negative electrode terminal 52 protrude.

The battery module 55 is received in a receiving container 69 together with each of the protective sheet 68 and the printed wiring board 56. In other words, the protective sheets 68 are disposed on both inner surfaces in a long side direction and one of the inner surfaces in a short side direction of the receiving container 69, and the printed wiring board 56 is disposed on the other inner surface in a short side direction. The battery module 55 is located in a space surrounded by the protective sheets 68 and the printed wiring board 56. A lid 70 is attached to the top of the receiving container 69.

In order to fix the battery module 55, a heat-shrinkable tape may be used in place of the adhesive tape 54. In this case, the battery module 55 is bound by placing the protective sheets on both side surfaces of the battery module 55, winding the heat-shrinkable tape and two protective sheets around the battery module 55, and thermally shrinking the heat-shrinkable tape.

Figure 8:
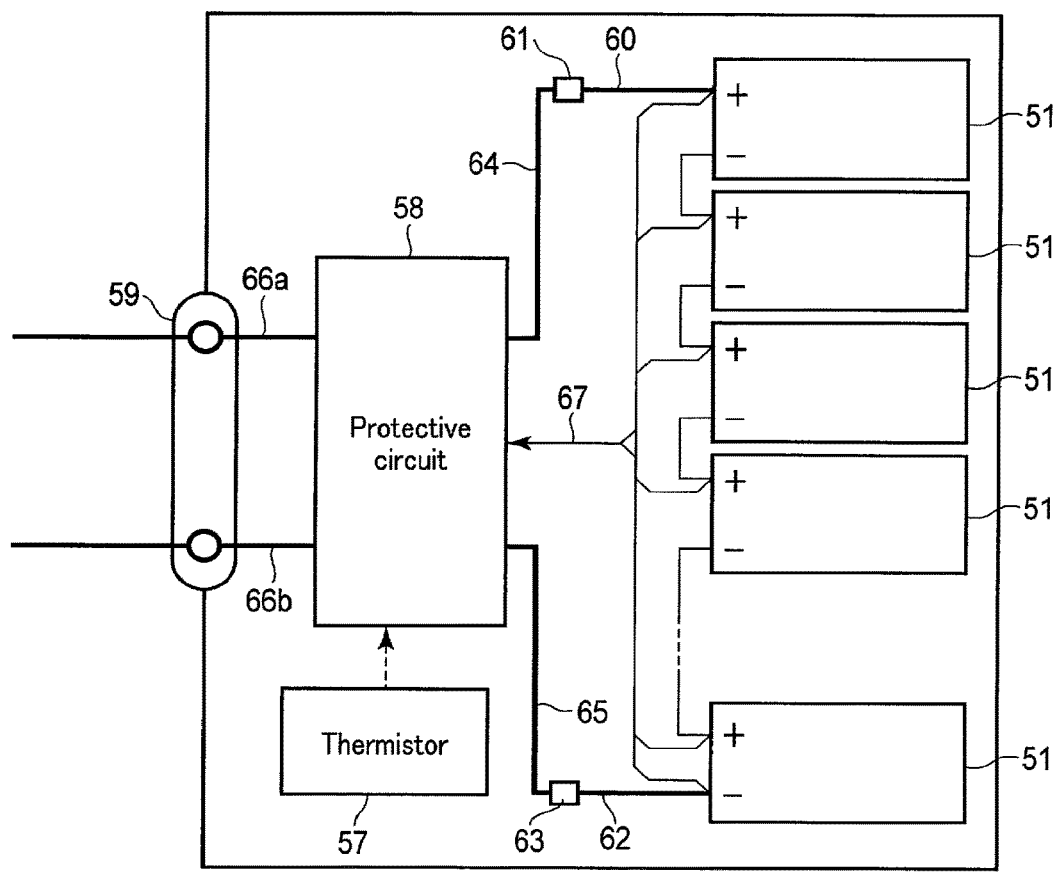
FIG. 8 is a block diagram showing an electric circuit of a battery pack shown in FIG. 7.

FIGS. 7 and 8 show a form in which the unit cells 51 are connected in series. As described above, the unit cells may be connected in parallel in order to increase the battery capacity. Alternatively, the unit cells may be connected in a combination of in series and in parallel. The assembled battery pack may be connected in series or in parallel.

The form of the battery pack is appropriately changed according to the use. Preferably, the battery pack is used for an application for which charge/discharge at high current is required. Specifically, the battery pack is used as a power source for digital cameras, for vehicles such as two- or four-wheeled hybrid electric vehicle, for two- or four-wheeled electric vehicles, for assisted bicycles, for stationary battery, and for rail way car. Particularly preferably, the battery pack is mounted to a vehicle.

In a vehicle such as an automobile to which the battery pack according to the embodiment is mounted, the battery pack is configured to recover a regenerative energy caused by power of the vehicle. Examples of the vehicle include two to four-wheeled hybrid electric automobiles, two to four-wheeled electric automobiles, electric assist bicycles, and electric trains.

As described above, the battery pack according to the second embodiment includes the secondary battery of the first embodiment so that it is possible to suppress the generation of hydrogen from the negative electrode current collector and achieve an excellent cycle life performance. According to the second embodiment, it is possible to provide a battery pack suitable as an alternative power source of a lead battery used as a starter power source for vehicle, or a vehicle-mounted secondary battery which is mounted in a hybrid car.

Third Embodiment

According to a third embodiment, a vehicle is provided. The vehicle includes the battery pack according to the second embodiment.

Figure 9:
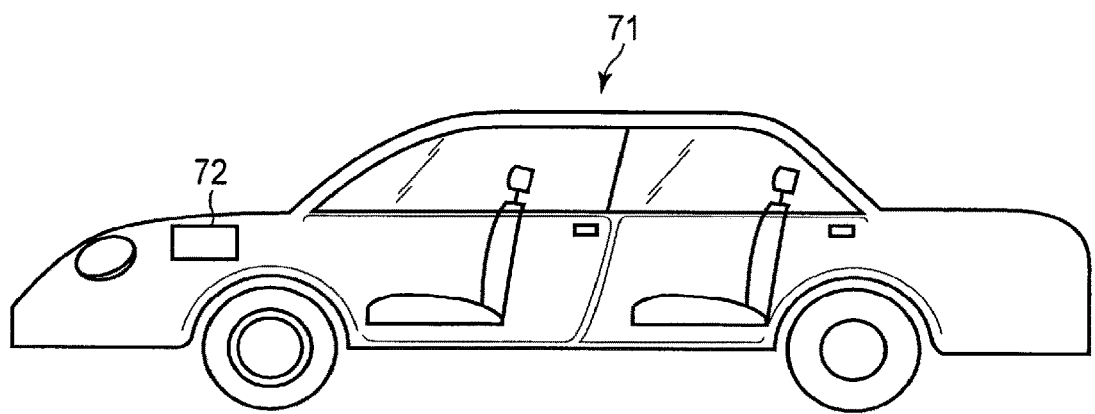
FIG. 9 is a cross-sectional view schematically showing an example of a vehicle according to a third embodiment.

FIG. 9 shows an example of a vehicle which includes the battery pack according to the second embodiment.

An automobile 71 shown in FIG. 9 has a battery pack 72 mounted in an engine room in front of a vehicle body. The location where the battery pack is mounted in the automobile is not limited to the engine room. For example, the battery pack may be mounted at the rear side of the vehicle body of the automobile or under the seat.

EXAMPLES

Hereinafter, Examples will be described, however, the embodiments are not limited to the following examples.

Example 1

<Production of Positive Electrode>

A positive electrode was produced as follows.

A lithium manganese oxide having a spinel structure ($LiMn_2O_4$) and an average particle size of 10 μm was used as a positive electrode active material, graphite powder was used as a conductive agent, and polyacrylimide (PAI) was used as a binder. The positive electrode active material, the conductive agent, and the binder were mixed together in amounts of 80% by weight, 10% by weight, and 10% by weight, respectively. The resulting mixture was dispersed in an N-methyl-2-pyrrolidone (NMP) solvent to prepare a slurry. The prepared slurry was applied onto both sides of a 12-μm-thick Ti foil as the positive electrode current collector and the coating films were dried to form positive active material layers. The positive electrode current collector and the positive active material layer thereon were pressed to form a positive electrode having an electrode density of 3.0 g/cm$^3$ (excluding the current collector).

<Production of Negative Electrode>

A negative electrode was produced as follows.

$Li_4Ti_5O_{12}$ powder having an average secondary particle size (diameter) of 15 μm was used as the negative electrode active material, graphite powder was used as the conductive agent, and PAI was used as the binder. The negative electrode active material, the conductive agent, and the binder were mixed together in amounts of 80% by weight, 10% by weight, and 10% by weight, respectively. The resulting mixture was dispersed in an NMP solvent to prepare a slurry. The obtained slurry was applied onto a 50-μm-thick Ti foil as the negative electrode current collector and the coating film was dried to form a negative electrode layer. Here, in a portion located at the outermost periphery of the negative electrode of the electrode group, the slurry was applied only to one side of the Ti foil. In the other portion, the slurry was applied to both sides of the Ti foil. The negative electrode current collector and the negative electrode layer thereon were pressed to form a negative electrode having an electrode density of 2.0 g/cm$^3$ (excluding the current collector).

<Production of Electrode Group>

A positive electrode produced in the above manner, a non-woven fabric separator formed of a 20-μm-thick cellulose fiber, a negative electrode produced in the above manner, and another non-woven fabric separator were stacked in this order to form a stacked body. Then, the stacked body was spirally wound so as to allowing the negative electrode to be located at the outermost periphery and thus an electrode group was produced. The electrode group was hot-pressed at 90° C. to form a flat-shaped electrode group. The obtained electrode group was received in a thin metal can formed of 0.25-mm-thick stainless steel.

The used metal can has a valve which leaks gas when the internal pressure becomes 2 atms or more.

<Preparation of Electrolyte Solution>

Electrolyte salts (3 M LiCl and 0.25 M $Li_2SO_4$) were dissolved in 1 L of water. To this aqueous solution, saccharin sodium salt as the organic sulfur compound was added at a concentration of 1 mM, and thus an electrolyte solution was obtained.

<Production of Secondary Battery and Initial Charge/Discharge>

A secondary battery having the structure shown in FIG. 1 was produced by pouring an electrolyte solution prepared in the above manner into the metal can container received the electrode group. After pouring the electrolyte solution, the secondary battery was left alone at 25° C. for 24 hours. Thereafter, the battery was subjected to an initial charge/discharge cycle at 25° C. In the initial charge/discharge cycle, the battery was first charged to 2.8 V at a constant current of 5 A and then charged to 1.5 V at a constant current of 1 A. When the initial charge/discharge cycle was performed, the capacity of the secondary battery was confirmed. The kind of the negative electrode active material, the kind of the organic sulfur compound, and the concentration of the compound in the electrolyte solution, which are used in Example 1, are compiled in Table 2 below. In Table 2, the "concentration" indicates the concentration of the organic sulfur compound in the electrolyte solution.

Examples 2 to 16 and Comparative Examples 1 to 4

Secondary batteries according to Examples 2 to 16 and Comparative examples 1 to 4 were produced in the same manner as in Example 1 except that the kind of the negative electrode active material, the kind of the positive electrode active material, the kind of the organic sulfur compound, and the concentration of the compound in the electrolyte solution were changed as shown in Table 2 below and the initial charge/discharge cycle was performed.

In Example 9, negative electrode active materials ($Li_4Ti_5O_{12}$ and rutile type $TiO_2$) were used at a weight ratio of 80:20. The secondary batteries according to Comparative examples 1, 3, and 4 were not operated due to the generation of gas from the negative electrode.

<Evaluation of Average Operating Voltage>

The second batteries produced in Examples 1 to 16 and Comparative examples 1 to 4 were subjected to an initial charge/discharge cycle and the average operating voltage was evaluated. These results are shown in Table 2 below.

As for secondary batteries in Comparative example 1 in which the organic sulfur compound was not added, Comparative example 3 in which the concentration of saccharin sodium salt was lower than 0.001 mM, and Comparative example 4 in which an organic sulfur compound not containing a nitrogen atom was used, gas was intensely generated from the negative electrode whereby the initial charge/discharge cycle could not be performed. Thus, the average operating voltage could not be calculated.

<Evaluation of Life Performance>

Each of the secondary batteries produced in Examples 1 to 16 and Comparative example 2 was subjected to a test to evaluate the cycle life performance as follows.

Each of the secondary batteries was charged to 2.8 V at a constant current of 3 A at 25° C., and then the quiescent time (30 minutes) was provided. After that, each of the secondary batteries was discharged to 1.5 V and then the quiescent time (30 minutes) was provided. The cycle from the charging to the end of the second quiescent time was defined as a first charge-and-discharge cycle. This charge-and-discharge cycle was repeated 50 times. The charge/discharge efficiency (discharge capacity/charge capacity) (%) was calculated from the charge capacity and the discharge capacity in the 50th charge-and-discharge cycle. The cycle test results are shown in Table 2 below. In Table 2, the "charge/discharge efficiency" indicates a value calculated from the charge capacity and the discharge capacity in the 50th charge-and-discharge cycle.

TABLE 2

| | Negative electrode active material | Positive electrode active material | Organic sulfur compound | Concentration (mM) | Average operating voltage (V) | Charge/discharge efficiency (%) |
|---|---|---|---|---|---|---|
| Example 1 | $Li_4Ti_5O_{12}$ | $LiMn_2O_4$ | Saccharin sodium salt | 1 | 2.44 | 88 |
| Example 2 | $Li_4Ti_5O_{12}$ | $LiMn_2O_4$ | Saccharin sodium salt | 20 | 2.42 | 82 |
| Example 3 | $Li_4Ti_5O_{12}$ | $LiMn_2O_4$ | Saccharin sodium salt | 0.01 | 2.46 | 85 |
| Example 4 | $Li_4Ti_5O_{12}$ | $LiMn_2O_4$ | 2-aminoethanethiol hydrochloride | 1 | 2.43 | 87 |
| Example 5 | $Li_4Ti_5O_{12}$ | $LiMn_2O_4$ | 2-amino alkyl sulfone hydrochloride | 1 | 2.46 | 80 |
| Example 6 | $Li_4Ti_5O_{12}$ | $LiMn_2O_4$ | derivatives of 2-mercaptobenzothiazole sulfonate | 0.1 | 2.41 | 91 |
| Example 7 | $Li_4Ti_5O_{12}$ | $LiMn_2O_4$ | Thiourea | 1 | 2.46 | 90 |
| Example 8 | $Li_4Ti_5O_{12}$ | $LiMn_2O_4$ | Cystine | 1 | 2.41 | 91 |
| Example 9 | $Li_4Ti_5O_{12}/TiO_2$ (Rutile type) 80/20 (wt %) | $LiMn_2O_4$ | Saccharin sodium salt | 1 | 2.3 | 89 |
| Example 10 | $Li_4Ti_5O_{12}$ | $LiMn_2O_4$ | Aminoacetonitrile sulfate | 1 | 2.46 | 80 |
| Example 11 | $Li_4Ti_5O_{12}$ | $LiMn_2O_4$ | 1,3-diisothiocyanate propane | 1 | 2.44 | 82 |
| Example 12 | $Nb_2TiO_7$ | $LiMn_2O_4$ | Saccharin sodium salt | 1 | 2.64 | 78 |
| Example 13 | $Nb_2TiO_7$ | $LiMn_2O_4$ | Thiourea | 1 | 2.64 | 82 |
| Example 14 | $Li_2Na_2Ti_6O_{14}$ | $LiMn_2O_4$ | Saccharin sodium salt | 1 | 2.72 | 72 |
| Example 15 | $Li_4Ti_5O_{12}$ | $LiCoO_2$ | Saccharin sodium salt | 1 | 2.41 | 89 |
| Example 16 | $Li_4Ti_5O_{12}$ | $LiMnPO_4$ | Saccharin sodium salt | 1 | 1.89 | 91 |
| Comparative example 1 | $Li_4Ti_5O_{12}$ | $LiMn_2O_4$ | Not added | 0 | — | — |
| Comparative example 2 | $Li_4Ti_5O_{12}$ | $LiMn_2O_4$ | Saccharin sodium salt | 25 | 2.01 | 55 |
| Comparative example 3 | $Li_4Ti_5O_{12}$ | $LiMn_2O_4$ | Saccharin sodium salt | 0.0005 | — | — |
| Comparative example 4 | $Li_4Ti_5O_{12}$ | $LiMn_2O_4$ | Dihydroxy diphenylsulfone | 1 | — | — |

As shown in Table 2, the lithium secondary batteries of Examples 1 to 16 exhibited a high charge/discharge efficiency after repeating the charge-and-discharge cycle 50 times. Among the examples of using $Li_4Ti_5O_{12}$ as the negative electrode active material, Example 6 of using derivatives of 2-mercaptobenzothiazole sulfonate as the sulfide compound, Example 7 of using thiourea, and Example 1 of using saccharin sodium salt as the sulfimide compound exhibited particularly an excellent charge/discharge efficiency.

In Examples 12 to 14 in which the kind of the negative electrode active material was changed to a niobium titanium oxide or a sodium niobium titanium oxide, a high average operating voltage was achieved while ensuring a sufficient charge/discharge efficiency.

In Examples 15 and 16 in which the kind of the positive electrode active material was changed to a lithium cobalt composite oxide or a lithium phosphate compound having an olivine structure, a sufficient charge/discharge efficiency was achieved.

As for the secondary batteries in Comparative example 1 in which the organic sulfur compound was not added and Comparative example 3 in which the concentration of the organic sulfur compound was lower than 0.001 mM, gas was generated from the negative electrode as described above, whereby it was not possible to stably operate the secondary batteries.

In Comparative example 2 in which the concentration of the saccharin sodium salt in the electrolyte solution was greater than 20 mM, the average operating voltage was inferior to those of the examples, and the charge/discharge efficiency was also remarkably low.

According to at least one of the embodiments and examples described above, the electrolyte contains a water-containing solvent, an electrolyte salt, and a nitrogen atom-containing organic sulfur compound, and the concentration of the nitrogen atom-containing organic sulfur compound in the electrolyte is within a range of from 0.001 mM to 20 mM. Thus, it is possible to suppress the generation of hydrogen from the current collector and achieve an excellent life performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery, comprising:
    a positive electrode;
    a negative electrode; and
    an electrolyte,
    wherein:
    the electrolyte comprises a water-containing solvent, an electrolyte salt, and a nitrogen atom-containing organic sulfur compound;
    the electrolyte is situated between and around the positive electrode and the negative electrode; and
    a concentration of the nitrogen atom-containing organic sulfur compound in the electrolyte is within a range of from 0.001 mM to 20 mM.

2. The secondary battery according to claim 1, wherein the nitrogen atom-containing organic sulfur compound comprises at least one selected from the group consisting of a sulfide compound, a disulfide compound, a thiol compound, a sulfenic acid compound, a sulfinic acid compound, a thiocarbonyl compound, a sulfimide compound, a sulfoxide compound, a sulfone compound, and a sulfonic acid compound.

3. The secondary battery according to claim 1, wherein the nitrogen atom-containing organic sulfur compound is at least one selected from the group consisting of saccharin sodium salt, thiourea, 2-aminoethanethiol hydrochloride, 2-amino alkyl sulfone hydrochloride, derivatives of 2-mercaptobenzothiazole sulfonate, cystine, aminoacetonitrile sulfate, and 1,3-diisothiocyanate propane.

4. The secondary battery according to claim 1, wherein the electrolyte salt comprises a lithium salt and a concentration of the lithium salt in the electrolyte is within a range of from 3 M to 10 M.

5. The secondary battery according to claim 4, wherein the lithium salt is lithium chloride.

6. The secondary battery according to claim 1, wherein the negative electrode has a specific surface area of from 3 $m^2/g$ to 50 $m^2/g$.

7. The secondary battery according to claim 1, wherein the negative electrode comprises at least one selected from the group consisting of a titanium oxide, a niobium titanium oxide, a sodium niobium titanium oxide and a lithium titanium oxide as a negative electrode active material.

8. The secondary battery according to claim 1, wherein the positive electrode comprises at least one selected from the group consisting of a lithium cobalt composite oxide, a lithium manganese composite oxide, and a lithium phosphate compound having an olivine structure as a positive electrode active material.

9. A battery pack, comprising the secondary battery according to claim 1.

10. The battery pack according to claim 9, further comprising:
    an external power distribution terminal; and
    a protective circuit.

11. The battery pack according to claim 9, comprising a plural of the secondary batteries, wherein the secondary batteries are electrically connected in series, in parallel, or in a combination of in series and in parallel.

12. A vehicle, comprising the battery pack according to claim 9.

13. The vehicle according to claim 12, wherein the battery pack is configured to recover a regenerative energy caused by power of the vehicle.

14. The secondary battery according to claim 1, wherein the water-containing solvent comprises 50% by volume or more of water.

15. The secondary battery according to claim 1, wherein:
    the water-containing solvent comprises 50% by volume or more of water;
    the nitrogen atom-containing organic sulfur compound is at least one selected from the group consisting of saccharin sodium salt, thiourea, 2-aminoethanethiol hydrochloride, 2-amino alkyl sulfone hydrochloride, derivatives of 2-mercaptobenzothiazole sulfonate, cystine, aminoacetonitrile sulfate, and 1,3-diisothiocyanate propane;
    the positive electrode comprises at least one selected from the group consisting of a lithium cobalt composite oxide, a lithium manganese composite oxide, and a lithium phosphate compound having an olivine structure as a positive electrode active material; and the negative electrode comprises at least one selected from the group consisting of a titanium oxide, a lithium titanium oxide, a niobium titanium oxide and a sodium niobium titanium oxide as a negative electrode active material.

16. The secondary battery according to claim 1, wherein the nitrogen atom-containing organic sulfur compound is at least one selected from the group consisting of saccharin sodium salt, 2-aminoethanethiol hydrochloride, 2-amino alkyl sulfone hydrochloride, derivatives of 2-mercaptobenzothiazole sulfonate, cystine, aminoacetonitrile sulfate, and 1,3-diisothiocyanate propane.

* * * * *